United States Patent
McCorkle

(10) Patent No.: US 7,697,907 B2
(45) Date of Patent: Apr. 13, 2010

(54) SYSTEM AND METHOD FOR CONTROLLING THE TRANSMIT POWER OF A WIRELESS MODULE

(75) Inventor: John W. McCorkle, Vienna, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 785 days.

(21) Appl. No.: 11/270,457

(22) Filed: Nov. 10, 2005

(65) Prior Publication Data

US 2007/0105582 A1 May 10, 2007

(51) Int. Cl.
 *H04B 1/04* (2006.01)
(52) U.S. Cl. .................. 455/127.2; 455/557; 455/69
(58) Field of Classification Search ............ 455/127.2, 455/557, 69, 522
See application file for complete search history.

(56) References Cited

U.S. PATENT DOCUMENTS

| | | | | |
|---|---|---|---|---|
| 5,623,486 | A * | 4/1997 | Dohi et al. | 370/342 |
| 5,790,662 | A * | 8/1998 | Valerij et al. | 380/2 |
| 6,226,502 | B1 * | 5/2001 | Chung | 455/118 |
| 7,092,693 | B2 * | 8/2006 | Boyden et al. | 455/402 |
| 7,110,727 | B2 * | 9/2006 | Dekker | 455/91 |
| 2003/0017805 | A1 | 1/2003 | Yeung et al. | |
| 2003/0075983 | A1 | 4/2003 | Stecyk et al. | |
| 2005/0047379 | A1 | 3/2005 | Boyden et al. | |
| 2006/0223578 | A1 * | 10/2006 | Conyers et al. | 455/557 |

FOREIGN PATENT DOCUMENTS

JP     2005176205 A  *  6/2005

OTHER PUBLICATIONS

Lewis, F.L. 'Wireless Sensor Networks'. In Smart Evironments: Technologies, Protocols, and Applications, John Wiley, New York, 2004. [retrieved on Oct. 23, 2007]. Retrieved from the Internet: <URL: http://crewman.uta.edu/psi/download/FLewis/Wireless-SensorNetChap04.pdf>.
International Search Report and Written Opinion, International Application No. PCT/US 06/60645, dated Feb. 12, 2008.

* cited by examiner

*Primary Examiner*—Lana N Le

(57) ABSTRACT

A method (600) for controlling a transmit power of an interface module (230) is provided. The method includes generating a transmit power code at a power code generator (240) (610); receiving the transmit power code at the interface module (620); receiving control signals at the interface module (650); and generating a transmit signal at a transmitter circuit (410) in the interface module based on the control signals and the transmit power code (660). In this method, the power level of the transmit signal is controlled by the transmit power code, and the transmitter circuit and the power code generator are formed on separate circuit elements.

19 Claims, 4 Drawing Sheets

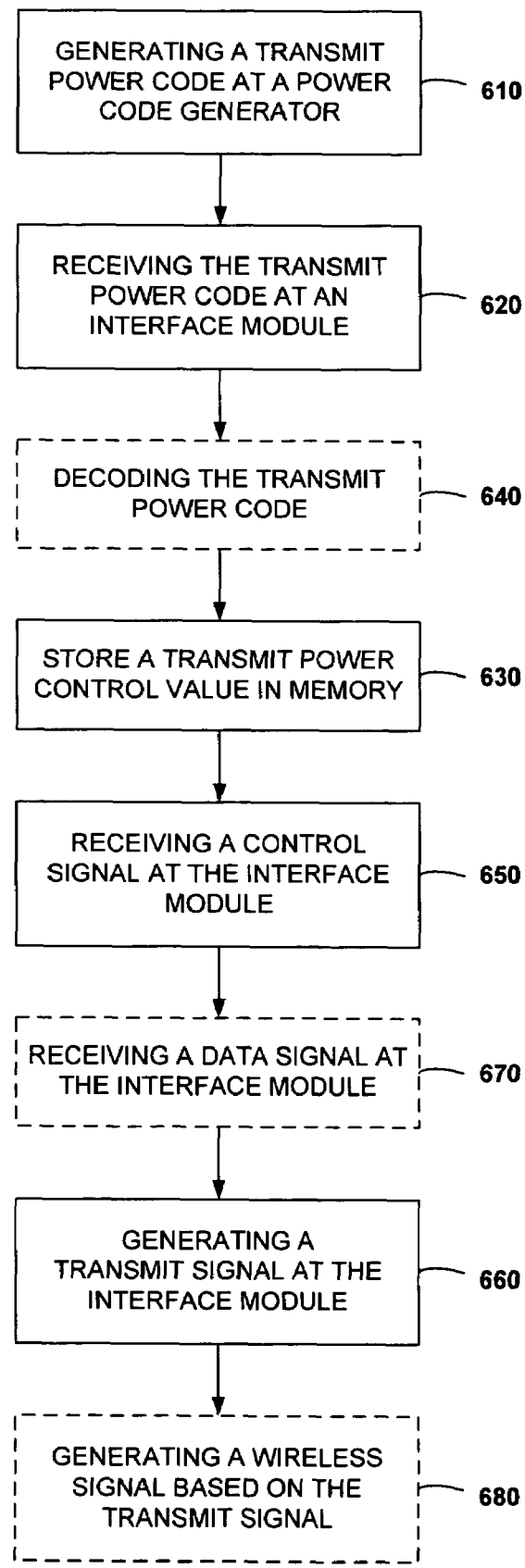

SYSTEM AND METHOD FOR CONTROLLING THE TRANSMIT POWER OF A WIRELESS MODULE

FIELD OF THE INVENTION

The present invention relates in general to the operation of devices that can coordinate with modules that allow for an interface with an external device or network, or an interface with an external function, such as radio detection and ranging (e.g., radar) operation. In particular the present invention relates to a system and method for allowing a single interface module to be used with multiple interface-enabled devices, while maintaining a desired interface transmit power level for signals across the interface.

BACKGROUND OF THE INVENTION

For many electronics devices, it may be desirable to provide an interface with an external device or network. This could be a connection to a local area network (LAN), a wireless LAN (WLAN), a personal area network (PAN), a wireless PAN (WPAN), the internet, a wire connection to a remote device using a coaxial cable or twisted pair cable, etc., or any other desired wireless or wired network. For example, it might be desirable to connect a television set to a WLAN so that its audio can be sent wirelessly to remote speakers; or it might be desirable to connect a digital camera to a WPAN so that its image data can be wirelessly downloaded to a personal computer; or it might even be desirable to connect a video camera to an Ethernet connection to send data to a remote device.

One way to implement this functionality is to provide a separate module for the device that will serve to facilitate the communication between the local device and the desired external device or network. This module will pass signals between the local device and the external device or network, handling all necessary data conversion to and from the different formats used by the local device and by the external device or network.

One parameter that can be of particular importance is the output power of the signal being sent by the module to the external device or network. In many situations, this power must be within a desired range. If the power is too high, then it might either overwhelm the receiver, or it might violate an imposed power level restriction. If the power is too low, the signal might be too faint for the external device or network to properly receive.

However, since different devices have different device parameters, each device may have different internal power requirements for the module it uses, even if the devices themselves desire the same level of power output for the desired transmission media. One device might operate using an antenna with a very small gain for signals sent externally by the module. In this case, the module must output a high power signal to make certain the signal radiated by the antenna will be at the proper power level. Contrarily, if a device employs operates using a high gain antenna for any signals sent externally by the module, the module should output a comparatively lower-powered signal to make certain the signal radiated by the antenna will be at the proper power level.

As a result, a separate module must be designed and tested for each device. And individual modules can't be used with any device save the one they were designed for. This is difficult from a manufacturing standpoint because a manufacturer may have to custom make a large number of different wireless modules for all of the devices that use a module. Each module must be tailored to its intended device to provide the desired level of output power to a particular output source. And using the wrong module could result in an incorrect output power, causing the interface with the external device or network to fail, or perhaps causing the data transmission to violate a set power requirement. As a result it can be difficult for a module maker to achieve certain economies of scale.

It can also be difficult for a device manufacturer to keep a desired level of inventory control for modules if it manufactures multiple devices that could interface with external devices or networks. And it raises the problem of improper modules being used by device manufacturers, resulting in incorrect operation of the devices.

It would therefore be desirable to provide a module design that would enable a single module to be used with multiple different devices, each with arbitrary couplings to the transmission media.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

FIG. 6 is a flow chart of the operation of the interface-connected device of FIGS. 2 and 3, according to a disclosed embodiment of the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

The circuits and methods described below are applicable to any wired or wireless interface module that has different output power requirements. One particular type of interface module in which the methods and circuits are particularly applicable is ultrawide bandwidth (UWB) interface module. However, they should not be limited to UWB interface modules.

Restrictions on Ultrawide Bandwidth Modules

Figure 1:
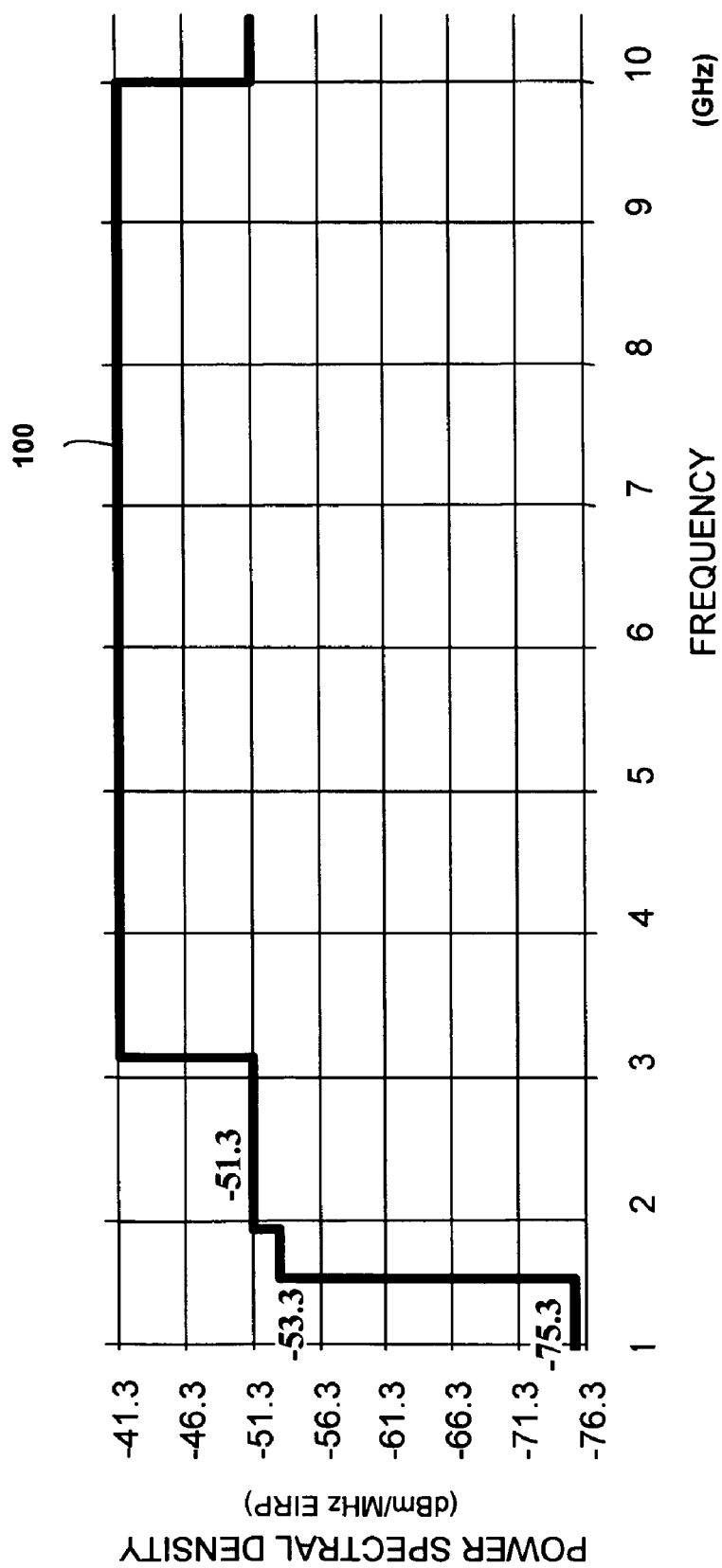
FIG. 1 is a graph of power spectral density limits set by the Federal Communications Commission for ultrawide bandwidth signals.

As noted above, one particular interface module is a UWB communications interface module. These UWB modules have a specific power limitation imposed upon them because of rules set forth by the Federal Communications Commission (FCC). FIG. 1 is a graph of power spectral density limits set by the FCC for UWB communications signals.

As shown in FIG. 1, the FCC has set a limit 100 on the isotropic radiated power level of all UWB signals over the range of possible frequencies, which is defined according to a set dBm/MHz EIRP limit below a set power threshold at any given frequency. The set power limit is defined in Part 15 of Title 47 of the Code of Federal Regulations.

Because of the power spectral density limits shown in FIG. 1, UWB communications interface modules must ensure that they do not exceed the power restrictions set forth by the FCC in any signals the interface-connected device transmits. However, in order to maximize range and signal quality, it is also desirable to make the power as close to these power limits as possible.

If the same type of UWB interface module is used in multiple devices, each will have to be configured to send a transmit signal at a variable power level that will depend upon the parameters of the current device, such as the loss and length of cable that connects a module to a media transducer (such as an antenna, loudspeaker, laser diode, etc.), and the gain of the transducer. These varied transmit signal power levels can be set so that the multiplicity of possible antennas each generate a radiated signal that has the same power level, regardless of the particular parameters of that antenna or device. In other words, depending upon how large and well-placed an antenna associated with the device is, a different amount of transmit power is required from a wireless interface module to get the same radiated field from the respective antenna.

Simplifying this power level coordination operation is important because in a regime such as UWB transmission in which a power ceiling is set, every device sold under that regime must go through a long and laborious certification process. In such a certification process, it is necessary to make a large number of measurements for the device in certain known operating conditions. These measurements could include determining that the device does not exceed the allowable maximum power for any frequency.

However, if a module had a known set of possible power levels for a UWB transmit signal it outputs, and these power levels were associated with a set of known antennas (each having a known set of gain parameters), it would be possible to determine whether any combination of power level setting and antenna design would meet the FCC's regulatory limits. Once each set of power/antenna pairs was certified, it should be possible for any device to pick an acceptable power/antenna pair and know that it will meet the mandated power limits. It would also be possible to simply set the module to provide signals that will cause the antenna to radiate a signal with a set default power limit appropriate for the highest gain transducer, thereby guaranteeing that a predetermined power threshold is never exceeded. In the alternative, the module and device could be provided with data that would control the output power of any transducer to be at a set power limit (e.g., having an equivalent isotropic radiated power level below −30 dBm/MHz). This can simplify the design of the module by having a single target power level rather than a stepwise target.

Furthermore, since a single module can be used in multiple devices, a module manufacturer need only make that single module, which can be provided to multiple device manufacturers. Each device manufacturer need only attach the module inside a given device and provide a mechanism to instruct the module to use the power level appropriate to the parameters of that device (e.g., antenna design and placement). This eliminates the need for the module manufacturer to make a separate module for each device manufacturer, and thus allows the module manufacturer to achieve certain economies of scale In addition, a device manufacturer can purchase a single module that can be used in multiple different UWB-enabled devices that the device manufacturer makes. For example, a consumer electronics company might want a UWB interface module for five different televisions, four different video cameras, and six different digital cameras. Using this design, that consumer electronics company could use the same module in all the devices. All it need do is provide an appropriate mechanism in each device to instruct the module to use the appropriate power level.

And when the device manufacturer develops a new UWB-enabled device, it can still use the same (earlier) module, since the each product tells the module how to configure itself.

Furthermore, if these transmit power codes are encoded (e.g., encrypted) when they are sent between the UWB-enabled device and the UWB interface module, end users of the resulting UWB-connected device will not be able to easily alter the assigned transmit power code to a different, valid transmit power code. In this case, even the device manufacturer need not know how to alter the encoded transmit power code to make the transmit power signal go up or down. That information can be held by the module manufacturer alone.

While the above disclosure relates specifically to a UWB regulatory environment, this is provided by way of example only. The present invention should not be limited to being applied only to UWB devices. In fact, the present invention could be applied to any wired, wireless, optical, or acoustic interface environment in which the output power of an interface signal must be controlled to meet certain limits.

One feature of this invention is that the power level is not controllable by a common user or device manufacturer. Only the module manufacturer is able to set the power by virtue of how it defines the encoding of the transmit power code. For example, the module manufacturer can instruct the device manufacturer what encoded transmit power code to use without providing the device manufacturer with any additional information that would allow the device manufacturer to use a different code.

Interface-Connected Device

Figure 2:
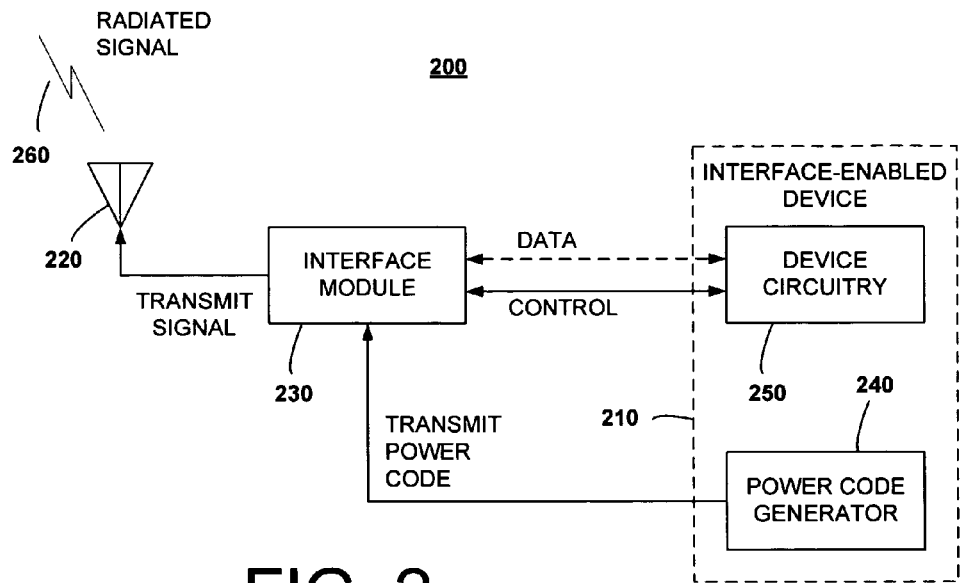
FIG. 2 is a block diagram of an interface-connected device, according to a first disclosed embodiment of the present invention.

An interface-connected device is therefore provided that allows for the use of a single type of interface module, whose output power can be controlled by the device it's attached to. FIG. 2 is a block diagram of an interface-connected device, according to a first disclosed embodiment of the present invention. In this embodiment, the device is connected to a wireless interface channel, i.e., the device transmits and receives wireless signals over the wireless interface channel.

As shown in FIG. 2, the interface-connected device 200 includes an interface-enabled device 210, antenna 220, and an interface module 230. The interface-enabled device 210 further includes a power code generator 240 and device circuitry 250.

The interface-enabled device 210 is a device designed to perform a primary function, and to communicate with an external device or network through the interface module 230. The interface-enabled device 210 could be any sort of electronic device for which it might be desirable to have such external communication or radar or broadcasting capability, and the primary functions it performs will vary according to device type. Examples of possible device types include a television, a digital camera, a video camera, a cell phone, and a memory stick, though this is not an exhaustive list, and the disclosed invention is applicable to any suitable device.

The power code generator 240 in the interface-enabled device 210 is a circuit separate from the interface module 230 that provides a transmit power code to the interface module 230. The transmit power code contains information that sets an output power for the interface module 230. In one implementation, the power code generator 240 is a memory device that contains the transmit power code. This could be implemented as a register, a random access memory (RAM), a read only memory (ROM), a programmable ROM (PROM), or other memory device that contains an appropriate transmit power code.

In alternate embodiments the power code generator 240 could have encoding capabilities. In this case, the power code generator 240 would have the circuitry required to encode the transmit power code. This could include circuitry to pass public or private keys between the power code generator 240 and the interface module 230, circuitry to implement an encryption or decryption algorithm on sent or received data, etc.

The device circuitry 250 in the interface-enabled device 210 represents the circuitry required for the interface-enabled device 210 to perform its primary function. For example, if the interface-enabled device 210 is a television, the device circuitry 250 would include all of the circuitry required for it to receive and display audio and video from a wireless signal or wired connection. Likewise, if the interface-enabled device 210 is a camera, the device circuitry 250 would include all of the circuitry required to capture and manipulate image data. The device circuitry 250 also includes the circuitry necessary to pass data or control signals to and from the interface module 230.

The interface module 230 receives control signals, and possibly data, from the device circuitry 250, and receives a transmit power code from the power code generator 240. Based on the control signals, transmit power code, and data (if present), the interface module 230 generates a transmit signal that it sends to the antenna 220 for transmission. In this wireless embodiment, the interface could be a ultrawide bandwidth radar interface, an ultrawide bandwidth communications interface, a Bluetooth interface, a WiFi interface, or any desired wireless interface.

The antenna 220 serves the function of a transducer, and is used to transmit and receive signals across the wireless interface. In the embodiment shown in FIG. 2, it receives the transmit signal from the interface module 230 and transmits a radiated signal 260 based on the transmit signal. The radiated power of the radiated signal 260 will be dependent upon the power level of the transmit signal (which is set by the transmit power code) and the physical parameters of the antenna 220 (e.g., size, shape, gain, position, etc.).

The antenna 220 can be designed as a physical part of the interface-enabled device 210, as a physical part of the interface module 230, or as a physically separate device that attaches to the interface module 230. Any antenna that is suitable for the desired wireless signal traffic can be used. The same will be true for alternate embodiments in which an alternate transducer design is used in place of the antenna 220.

It should be noted that this antenna 220 is provided to serve the interface module 230. Depending upon the function of the interface-enabled device 210, the device circuitry 250 might have an additional antenna that services another function, e.g., a cell phone antenna or a television antenna. In some embodiments, however, the interface module 230 and the interface-enabled device 210 might share an antenna 220 or other type of transducer.

In different embodiments, the parameters of the device circuitry 250 and the antenna 220 can vary. For example a large device, such as a television, might have a large antenna with a relatively large gain. Smaller devices, such as cameras and cell phones, might have smaller antennas with correspondingly smaller gains. Very small devices, such as memory sticks might have very small, and possibly very poorly-placed, antennas, with comparatively small gains and poor transmission parameters.

These varying system parameters can be used to determine how the power code generator 240 should set the transmit power code. In particular, the specific transmit power codes used for a given device can be chosen based on a device's system parameters to provide a transmit signal that will generate a radiated signal 260 of an appropriate power level. Since the module and device manufacturers will know these parameters and requirements beforehand, they can determine the required transmit power codes during manufacturing and set their devices accordingly.

Figure 3:
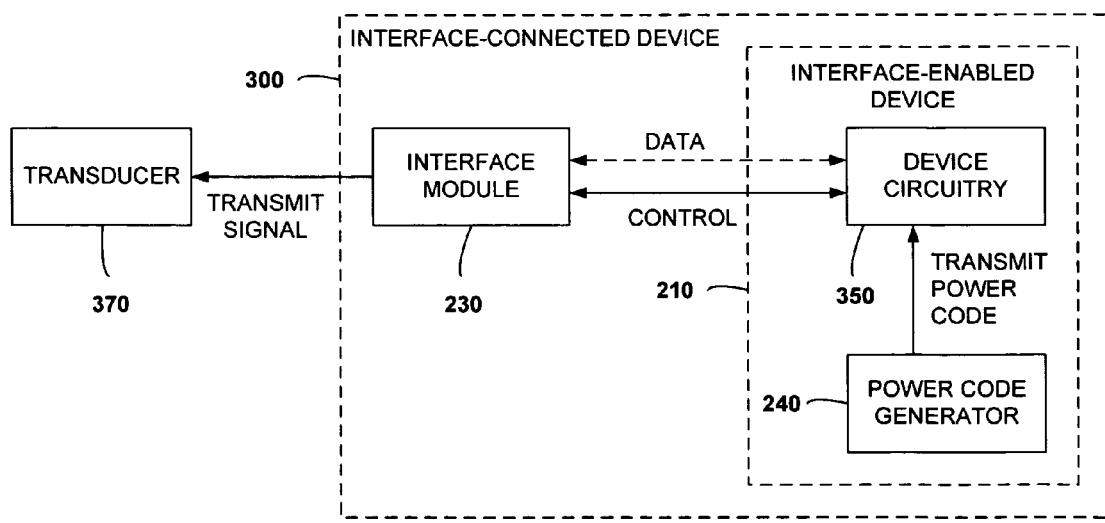
FIG. 3 is a diagram of interface-connected device, according to a second disclosed embodiment of the present invention.

FIG. 3 is a diagram of interface-connected device, according to a second disclosed embodiment of the present invention. In this embodiment, the device is connected to a wired medium, such as a coaxial cable or a twisted pair through a balun or a transformer as a transducer. In operation, the device passes signals to (and possibly from) an external device or network via this wired medium. Alternate embodiments that use different transmission media (e.g., a dielectric media that uses an antenna as a transducer, an acoustic media that uses a loudspeaker as a transducer, or a fiber optic media that uses a light source as a transducer).

As shown in FIG. 3, the interface-connected device 300 includes an interface-enabled device 310 and an interface module 230. The interface-enabled device 310 further includes a power code generator 240 and device circuitry 350. The interface module 230 is connected to a transducer 370 that connects the interface module 230 to a desired media that passes signals to an external device or network (not shown).

The interface-enabled device 310 is a device designed to communicate with an external device or network through the interface module 230. It is described in detail with respect to FIG. 2.

The power code generator 240 in the interface-enabled device 310 is a circuit separate from the interface module 230 that generates a transmit power code. In this embodiment the power code generator 240 does not provide the transmit power code directly to the interface module 230, but rather provides it to the device circuitry 350. The device circuitry 350 can then provide the transmit power code to the interface module 230 along with other control signals.

As in the embodiment of FIG. 2, the transmit power code contains information that sets an output power for the interface module 230. The power code generator 240 can have all of the various implementations discussed above with respect to FIG. 2, including all of the various mechanisms for encoding the transmit power code.

The device circuitry 350 in the interface-enabled device 310 represents the circuitry required for the interface-enabled device 310 to perform its primary function and send control and possibly data signals to the interface module 230, as described above. It also includes circuitry to pass along the transmit power code received from the power code generator 240.

The transducer 370 connects the interface module 230 to the desired transmission media. If the interface is a radio frequency (RF) transmission through the open air or a waveguide (e.g., a gas pipe), the transducer 370 could be an antenna, as shown in FIG. 2. If the interface is a RF transmission over a wire such as a coaxial cable or twisted pair, the transducer 370 could be a balun or a transformer. If the interface is an acoustic transmission through air, the transducer 370 could be a loudspeaker. If the interface is an optical transmission over a fiber optic cable, the transducer 370 could be a laser, incandescent light source, etc. For ease of disclosure, the transducer 370 in FIG. 3 will be considered a balun or transformer suitable to a wired RF transducer 370. However, this disclosure is equally applicable to systems using other transmission media and other transducer choices.

The interface module 230 receives control signals, transmit power code, and possibly data, from the device circuitry 350. Based on the control signals, transmit power code, and data (if present), the interface module 230 generates a transmit signal that it sends to the transducer 370 for transmission. In this wired embodiment, the interface could send signals using an internet protocol, an Ethernet protocol, a Firewire protocol, a USB protocol, or any suitable wired protocol.

Since the exemplary embodiment being discussed with respect to FIG. 3 is a wired embodiment, the transmit signal generated by the interface module 230 is sent to the external device or network via the transducer 370 that is connected to the interface module 230. Alternate embodiments could have the output of the interface module 230 connected directly to the external device or network.

Varying system parameters in different the interface-connected devices 300 can influence how the power code generator 240 should set the transmit power code for that particular device. In particular, the specific transmit power codes used for a given device can be chosen based on a device's system parameters to provide a transmit signal of an appropriate power level.

Although in these embodiments the transmit power code may be sent in the clear (i.e., unencoded), it would still be difficult for an end user to identify and alter the transmit power code that is provided to the interface module 230. Since the power code generator 240 and the interface module 230 are both integrated into the interface-connected device 200, 300, a user would have to open up the interface-connected device 200, 300 determine what line in the internal circuitry carried the transmit power code, and when that code was passed, and then use a signal analyzer to determine the value of that code in order to track the transmit power code. This is a sufficiently difficult process that few people would even attempt it, and even then the chance of success would be small. This should be sufficient to give regulators a high level of comfort that altering the output power of devices would be very uncommon.

The embodiments of FIGS. 2 and 3 are shown by way of example only. Particular elements in each embodiment can be mixed together in alternate embodiments. For example, a wired interface could be used in which the power code generator 240 provided a transmit power code directly to an interface module 230. Likewise, a wireless interface could be used in which the power code generator 240 provided the transmit power code to device circuitry 350 to send to the interface module 230 with other control signals.

Interface Module

Figure 4:
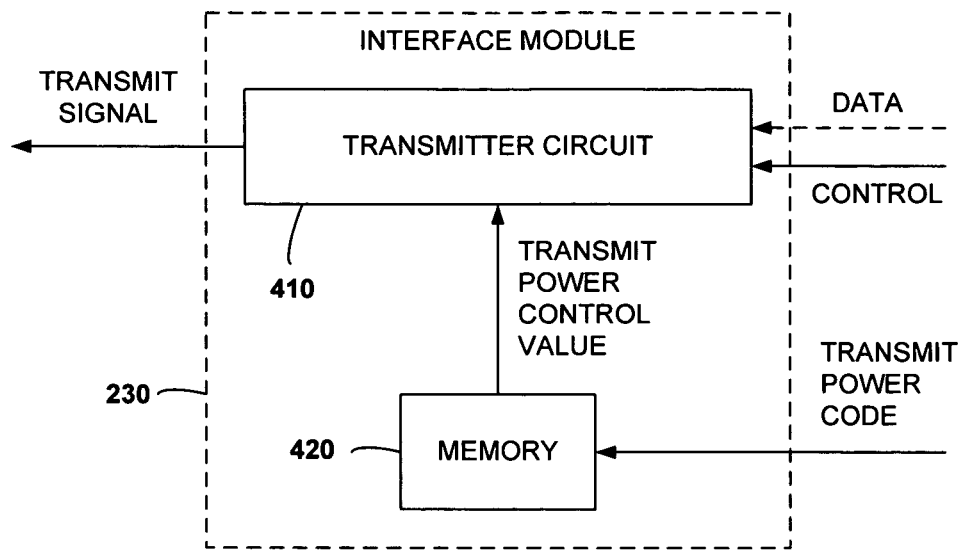
FIG. 4 is a diagram of the interface module of FIGS. 2 and 3, according to a first disclosed embodiment of the present invention.

FIG. 4 is a diagram of the interface module of FIGS. 2 and 3, according to a first disclosed embodiment of the present invention. As shown in FIG. 4, the interface module 230 includes a transmitter circuit 410 and a memory 420.

The transmitter circuit 410 contains all the elements required to send transmit signals to (and possibly receive incoming signals from) the relevant interface channel, whether that interface channel is wired or wireless. In particular, the transmitter circuit 410 will be configured to generate a transmit signal appropriate to the interface channel at a power level determined by the transmit power code (or more appropriately, determined by the transmit power control value, which is itself determined by the transmit power code).

The particular parameters of the transmitter circuit 410 will vary depending upon what type of interface is used. For example, if the interface is an ultrawide bandwidth (UWB) radar interface, the transmitter circuit 410 could be a UWB radar transceiver configured to send and receive UWB radar signals over a wireless channel in response to received control signals and transmit power codes. If the interface is a wireless UWB communications interface, the transmitter circuit 410 could be a UWB data transceiver configured to send and receive UWB data signals over a wireless channel or waveguide in response to received control signals, data signals, and transmit power codes. And if the interface is a coaxial connection, the transmitter circuit 410 could contain coaxial connection circuit configured to send and receive signals over a wired coaxial connection in response to received control signals, data signals, and transmit power codes. Many other types of interface are, of course, possible, including optical or acoustic interfaces.

In the interface-connected device 200, 300 the transmitter circuit 410 and the power code generator 240 are formed on separate circuit elements. For example, they could be formed in separate integrated circuits, on separate circuit boards, or in separate housings. This allows the module manufacturer to generate a single type of interface module 230, while allowing the device manufacturer to provide the additional circuitry in the power code generator 410 to customize the interface module 230 to the particular device.

The memory 420 is a memory element that receives the transmit power code from the interface-enabled device 210, 310, and stores it as a transmit power control value. This transmit power control value is then provided to the transmitter circuit 410 as needed to set the power level of the transmit signal. The transmit power code can be received directly from a power code generator 240, or it could be received along with control signals from device circuitry 350.

The memory 420 can be implemented as any suitable memory device that can periodically change its stored value.

This can include a register, a volatile random access memory (RAM) (e.g., static RAM or dynamic RAM), a non-volatile RAM (e.g., flash memory), electrically erasable programmable read only memory (EEPROM), or any device that performs a similar function.

In the embodiment shown in FIG. 4, the transmit power code is stored directly into the memory 420 as the transmit power control value. In alternate embodiments, however, some processing can be performed on the transmit power code to obtain the transmit power control value for storage into the memory 420.

The possible settings for the transmit power control value correspond to possible power settings for the transmitter circuit 410. In other words, every valid setting for the transmit power control value corresponds to a valid power level for the transmit signal generated by the transmitter circuit 410. In some embodiments there can be a one-to-one relationship between valid transmit power code settings and valid transmit power control value. In other embodiments this need not be the case. For example, multiple valid settings of the transmit power code could map to the same valid transmit power control value settings. In yet another embodiment a very high percentage of possible transmit power code could map to a default setting for the transmit power control value. For example, a 256-bit transmit power code could map to $2^8$ valid power levels, with $2^{248}$ settings mapping to a default value. This would make the valid settings difficult to find.

Figure 5:
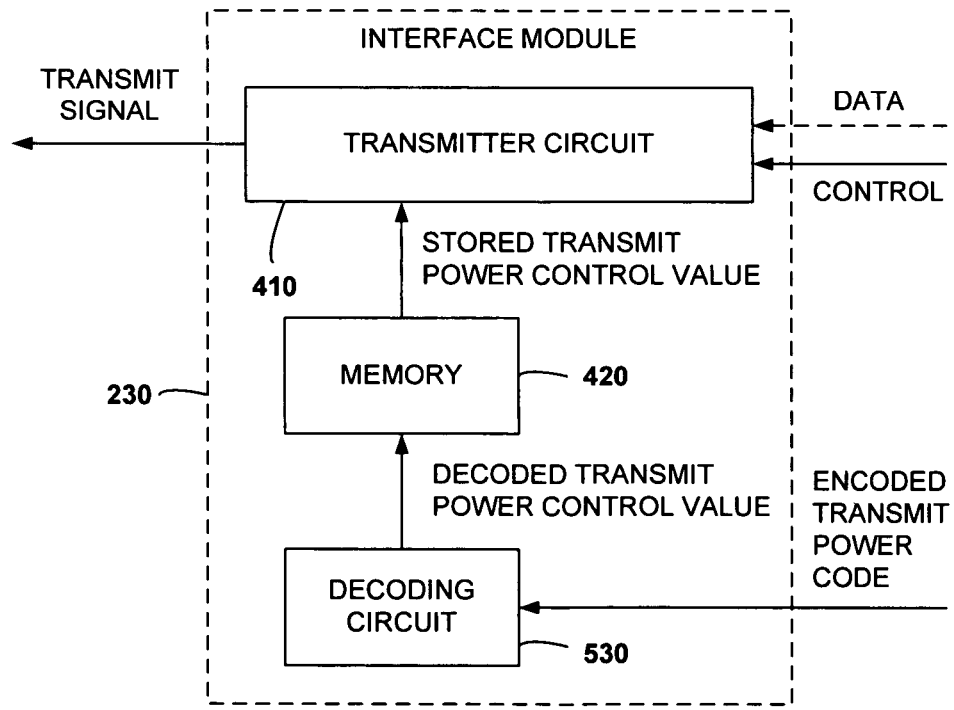
FIG. 5 is diagram of the interface module of FIGS. 2 and 3, according to second disclosed embodiment of the present invention.

FIG. 5 is a diagram of the interface module of FIGS. 2 and 3, according to second disclosed embodiment of the present invention. As shown in FIG. 5, the interface module 230 includes a transmitter circuit 410, a memory 420, and a decoding circuit 530.

The transmitter circuit 410 and the memory 420 operate as described above with respect to FIG. 4. However, in this embodiment the memory 420 receives a decoded transmit power control value from the decoding circuit 530, rather than a transmit power code from the interface-enabled device 210, 310. As in the embodiment of FIG. 4, the transmitter circuit 410 and the power code generator 240 are formed on separate circuit elements.

The decoding circuit 530 receives an encoded transmit power code from the interface-enabled device 210, 310, decodes the encoded transmit power code to generate a decoded transmit power control value, and provides the decoded transmit power control value to the memory 420, which then stores it as a stored transmit power control value. As with the embodiment of FIG. 4, the stored transmit power control value is then provided to the transmitter circuit 410 as needed to set the power level of the transmit signal. In this embodiment the transmit power code can be received directly from a power code generator 240, or it could be received along with control signals from device circuitry 350.

In the embodiment of FIG. 5, the interface-enabled device 310 provides an encoded transmit power code to the interface module 230. By encoding the transmit power code before it's sent to the interface module 230 (e.g., through encryption), the system provides a level of security with respect to the transmit power code.

In particular, this encoding could ensure that a manufacturer of the interface-enabled device 210 or some other third party cannot easily alter the power code generator 240 or the transmit power code to improperly increase the transmit power signal generated by the wireless module. Such tampering would be undesirable because if the transmit power signal increases beyond the maximum value allowed for the particular implementation for the antenna 120, the radiated power of the wireless signal could rise above the regulatory limits.

This encoding process can be accomplished by embedding a control word in a larger encoded signal generated by the power code generator 240. For example, the system could use a multiple-bit transmit power code that only employs a small fraction of available values as valid transmit power codes. For example, the transmit power code could be 64 bits (having $2^{64}$ possible combinations), but only have 128 values that are valid for controlling the power of a transmit signal. As a result, a randomly-chosen transmit power code is unlikely to be valid.

In fact, the portion of the transmit power code that actually passes instruction to the interface module 230 can be spread out over the whole transmit power code, making it very difficult for an end user to determine exactly which portion of the transmit power code is used by the interface module 230. This makes it correspondingly difficult for the end user to alter the transmit power code in a useful manner.

Encoding of the transmit power code could also be accomplished by having the power code generator 240 pass a key-encrypted transmit power signal to the interface module 230. In this embodiment, the power code generator 240 and the interface module 230 pass keys that are processed according to a set algorithm in the power code generator 240 to generate a valid transmit power code. The keys could change over time, and the power code generator 240 could be required to pass a test each time it provides a transmit power code to the interface module 230.

Some examples of possible encoding schemes are: the data encryption standard (DES), the advanced encryption standard (AES), public-private key encryption, an NTRU encryption process, or any suitable mechanism for encrypting data. Alternate encoding or encrypting mechanisms are possible, as would be known to one skilled in the art.

Regardless of how encoding is accomplished, this makes it extremely difficult for an end user to simply read the code provided by a power code generator 240 in a first interface-enabled device 210 and provide it to the interface module 230 in a second interface-enabled device 210 to alter the transmit power signal in the interface module 230 of the second interface-enabled device. Because the transmit power code is encoded or even changing adaptively, it would be very difficult for an end user to determine how the transmit power signal in the wireless module is actually being controlled.

In this way, the transmit power code provided by the power code generator 140 might have billions of possible values, with only a few of them mapping to proper instructions to set the level of the transmit power signal generated by the wireless module 130 to drive the antenna 120.

By encoding the transmit power code, this embodiment can provide regulators with a level of comfort that end users or others will find it difficult to alter the transmit power code in a way that will provide a proper instruction to the interface module 230 to change the power level of the transmit signal output by the interface module 230.

Method of Operating an Interface Module

FIG. 6 is a flow chart of the operation of the interface-connected device of FIGS. 2 and 3, according to a disclosed embodiment of the present invention.

As shown in FIG. 6, operation begins when the power code generator 240 generates a transmit power code. (610) This transmit power code can be sent directly to the interface module 230, or it can be sent to some part of the device circuitry 250, 350, which then forwards it to the interface module 230 along with one or more control signals.

Regardless of the precise route it takes, the transmit power code is then received at the interface module 230 (620), which stores a transmit power control value in a memory 420 based on the transmit power code. (630). In some embodiments the transmit power control value is the same as the transmit power code, in which case the transmit power control value is stored directly as the transmit power code.

In other embodiments the transmit power control value is encoded into the transmit power code. In these embodiments a decoding process (e.g., a decryption process) is performed on the transmit power code to extract the transmit power control value (640), which is then stored in the memory. (630) This decoding process can be performed as described above with respect to FIG. 5. In particular, it could involve. the data encryption standard (DES), the advanced encryption standard (AES), public-private key encryption, an NTRU encryption process, having a large number of transmit power code settings with only a small number of the transmit power code settings mapping to valid transmit power control values, or any suitable mechanism for encoding or encrypting data.

After storing the transmit power control value in memory (630), the interface module 230 then receives one or more control signals instructing it to transmit a signal to an external device or network. (650) The one or more control signals provide all of the information necessary for sending a transmit signal, except for an indication of the power level of the transmit signal.

The interface module 230 then transmits a signal based on both the one or more control signals and the stored transmit power control value. (660) The one or more control signals define the basic parameters of the transmit signal sent from the interface module 230, while the stored transmit power control value defines the power level of the transmit signal.

In embodiments in which the interface is a data-carrying interface, the transmitter circuit 410 also receives a data signal from the device circuitry 250, 350. (670) This data can then be encoded into the transmit signal prior to it being sent.

If the interface is a wired interface, then the transmit signal can be provided either directly along a wire, coaxial cable, waveguide, or optical fiber to its destination device or network or through a transducer. If, however, the interface is a wireless interface, then the transmit signal will be provided to an antenna 220, which will generate a radiated signal 260 based on the transmit signal. (680) In this case, the radiated power level of the radiated signal 260 will depend upon the power level of the transmit signal and the parameters of the antenna 220 (e.g., antenna gain, antenna position, etc.). And since the power level of the transmit signal is dependent upon the transmit power control value, which is dependent upon the transmit power code, this means that the radiated power level of the radiated signal 260 is ultimately dependent upon the transmit power code and the parameters of the antenna 220.

By making certain that a proper transmit power code is used for any given set of device parameters, this process can ensure that any required signal power limits are met. For example, in a wired interface, the transmit power code can be selected to provide a transmit power control value that ensures that the power level of the transmit signal is below any desired limit. Likewise, in a wireless interface, the transmit power code can be selected to provide a transmit power control value that is appropriate to the antenna being used in the current device. In this way the device with the worst parameters (e.g., the smallest antenna having the smallest gain and the worst antenna position) would be given a transmit power code that provided a transmit power control value that generates a transmit signal at the highest possible power level. And the device with the best parameters (e.g., the largest antenna having the largest gain and the best antenna position) would be given a transmit power code that that provided a transmit power control value that generates a transmit signal having the lowest possible power level. Intermediate gains and antenna positions would require transmit power codes that fall in the middle.

Thus, for each device, the transmit power code could be chosen, based on all relevant parameters, to provide a transmit signal that had an appropriate power level for obtaining the desired radiated signal power level. In this way the device could meet any limits imposed on the radiated signal power level, whether regulatory limits, standards limits, or self-imposed system limits.

In some embodiments in which no decoding process (640) is used, the storing of the transmit power control value into memory 420 (630) can be omitted. In this case, the transmit power code will be sent directly to the transmitter circuit 410 by the power code generator 240 or the device circuitry 350 and the transmitter circuit 410 will use the transmit power code as a transmit power control value. This can be done separately from or contiguously with the sending of the one or more control signals. (650)

In some embodiments that use encoding, a transmit power control value is decoded (640) and stored in memory 420 (630) a single time for a given interface module 230. After this initial decoding, the stored transmit power control value is used for all future transmit signals. In other embodiments the receiving (620), decoding (640), and storage (630) processes may be repeated as many times as desired between sending transmit signals (660).

Furthermore, it is possible in some embodiments to eliminate the processes of receiving the transmit power code (620), decoding the transmit power code to extract a transmit power control value (640), and storing the transmit power control value in memory 420 (630). In these embodiments, a default transmit power control value is used. The default transmit power control value is stored in a memory the interface module 230 (which may be the memory 420 or may be another memory unit).

If the interface module 230 does not receive a transmit power code at the proper time for preparing a transmit signal, then the power level of the transmit signal is determined by the default transmit power control value. If the default transmit power control value is chosen to represent the lowest available power level, then absent any valid instruction to the contrary the transmit signal will be transmitted at the lowest power level. This can help avoid inadvertently sending a transmit signal at too high a power level.

Conclusion

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. An interface module for generating a transmit signal, comprising:
    a decoding circuit for converting an encoded transmit code to a decoded transmit power control value;
    a memory for storing the decoded transmit power control value received from the decoding circuit as a stored transmit power control value; and
    a transmitter circuit for generating the transmit signal in response to a control signal,
    wherein a power level of the transmit signal is controlled by the stored transmit power value, and
    wherein the ratio of the length of the encoded transmit code to the length of the decoded transmit power control value is greater than ten.

2. An interface module for generating a transmit power signal, as recited in claim 1, wherein the transmitter circuit encodes bits of data into the transmit signal based on a received data signal.

3. An interface module for generating a transmit power signal, as recited in claim 1, wherein the transmit signal is one of an ultrawide bandwidth signal, a WiFi signal, a Bluetooth signal, an optical signal, or an acoustic signal.

4. An interface module for generating a transmit power signal, as recited in claim 1, wherein the decoding circuit is a decrypting circuit.

5. An interface module for generating a transmit power signal, as recited in claim 4, wherein the decrypting circuit uses one of a data encryption standard decrypting, an advanced encryption standard decryption, a public-private key decryption, and NTRU decryption.

6. A device with an external signal interface, comprising:
    a power code generator for generating an encoded transmit power code;
    a decoding circuit for receiving the encoded transmit power code over a fixed wired connection, and converting the encoded transmit power code to a decoded transmit power control value;
    a memory for storing the decoded transmit power control value received from the decoding circuit as a stored transmit power control value;
    device circuitry for generating control signals;
    a transmitter circuit for generating a transmit signal based on the control signals and the stored transmit power control value;
    wherein a power level of the transmit signal is controlled by the stored transmit power control value,
    wherein the power code generator and the transmitter circuit are formed on separate circuit elements, and
    wherein the ratio of the length of the encoded transmit power code to the length of the decoded transmit power control value is greater than ten.

7. A device with an external signal interface, as recited in claim 6, wherein the decoding circuit receives the transmit power code on the same data connection as the transmitter circuit receives the control signals.

8. A device with an external signal interface, as recited in claim 6, wherein the separate circuit elements are one of separate integrated circuits, separate circuit boards, or separate housings.

9. A device with an external signal interface, as recited in claim 6, wherein the decoding circuit is a decrypting circuit which uses one of a data encryption standard decrypting, an advanced encryption standard decryption, a public-private key decryption, and NTRU decryption.

10. A device with an external signal interface, as recited in claim 6,
    further comprising an antenna for receiving the transmit signal and generating a wireless signal at a radiated power level,
    wherein the radiated power level is determined by the stored transmit power control value and physical properties of the antenna.

11. A device with an external signal interface, as recited in claim 10, wherein the radiated power level has an equivalent isotropic radiated power level below −30 dBm/MHz.

12. A device with an external signal interface, as recited in claim 10, wherein the wireless signal is one of an ultrawide bandwidth radar signal, an ultrawide bandwidth communications signal, a WiFi signal, a Bluetooth signal, an optical signal, or an acoustic signal.

13. A method for controlling a transmit power of an interface module:
    generating an encoded transmit power code at a power code generator;
    receiving the encoded transmit power code at the interface module over a fixed wired connection;
    decoding the transmit power code to generate a decoded transmit power control value;
    receiving control signals at the interface module; and
    generating a transmit signal at a transmitter circuit in the interface module based on the control signals and the decoded transmit power control value,
    wherein a power level of the transmit signal is controlled by the transmit power control value,
    wherein the transmitter circuit and the power code generator are formed on separate circuit elements, and
    wherein the ratio of the length of the encoded transmit power code to the length of the decoded transmit power control value is greater than ten.

14. A method for controlling a transmit power of an interface module, as recited in claim 13, further comprising:
    receiving a data signal including transmission data at the transmitter circuit module; and
    encoding the transmission data into the transmit signal.

15. A method for controlling a transmit power of an interface module, as recited in claim 13, wherein the decoding is performed by a data encryption standard decrypting, an advanced encryption standard decryption, a public-private key decryption, and NTRU decryption.

16. A method for controlling a transmit power of an interface module, as recited in claim 13,
    further comprising generating a wireless signal at a radiated power level based on the transmit signal,
    wherein the radiated power level is determined by the transmit power code and physical properties of an antenna.

17. A method for controlling a transmit power of an interface module, as recited in claim 16, wherein the radiated power level has an equivalent isotropic radiated power level below −30 dBm/MHz.

18. A method for controlling a transmit power of an interface module, as recited in claim 13, wherein the wireless signal is one of an ultrawide bandwidth radar signal, an ultrawide bandwidth communications signal, a WiFi signal, a Bluetooth signal, an optical signal, or an acoustic signal.

19. A method for controlling a transmit power of an interface module, as recited in claim 13, further comprising providing the transmit signal to a wired network.

* * * * *